(12) United States Patent
Burgess et al.

(10) Patent No.: US 7,756,900 B2
(45) Date of Patent: Jul. 13, 2010

(54) VISUAL INTERFACE TO INDICATE CUSTOM BINNING OF ITEMS

(75) Inventors: David A. Burgess, Menlo Park, CA (US); Amit Umesh Shanbhag, San Francisco, CA (US); Joshua Ethan Miller Koran, Mountain View, CA (US); Glen Anthony Ames, Mountain View, CA (US); Sundara Raman Rajagopalan, Sunnyvale, CA (US); Lisa Akerman Ford, San Jose, CA (US)

(73) Assignee: Yahoo!, Inc., Sunnyvale, CA (US)

( * ) Notice: Subject to any disclaimer, the term of this patent is extended or adjusted under 35 U.S.C. 154(b) by 448 days.

(21) Appl. No.: 11/752,048

(22) Filed: May 22, 2007

(65) Prior Publication Data

US 2008/0294595 A1    Nov. 27, 2008

(51) Int. Cl.
G06F 17/30    (2006.01)

(52) U.S. Cl. .................................... 707/801
(58) Field of Classification Search ............... 707/801
See application file for complete search history.

(56) References Cited

U.S. PATENT DOCUMENTS

| | | | | |
|---|---|---|---|---|
| 5,308,058 A | * | 5/1994 | Mandel et al. | 271/289 |
| 5,328,169 A | * | 7/1994 | Mandel | 271/290 |
| 5,342,034 A | * | 8/1994 | Mandel et al. | 270/58.08 |
| 5,358,238 A | * | 10/1994 | Mandel et al. | 271/298 |
| 5,390,910 A | * | 2/1995 | Mandel et al. | 271/296 |
| 5,435,544 A | * | 7/1995 | Mandel | 271/298 |
| 5,547,178 A | * | 8/1996 | Costello | 270/52.02 |
| 5,550,964 A | | 8/1996 | Davoust | |
| 6,278,989 B1 | * | 8/2001 | Chaudhuri et al. | 707/2 |
| 6,351,754 B1 | * | 2/2002 | Bridge et al. | 707/202 |
| 6,438,552 B1 | * | 8/2002 | Tate | 707/10 |
| 6,499,032 B1 | * | 12/2002 | Tikkanen et al. | 707/101 |
| 6,505,206 B1 | * | 1/2003 | Tikkanen et al. | 707/101 |

(Continued)

OTHER PUBLICATIONS

K.-L. Wu, P.S. Yu, "Range-Based Bitmap Indexing for High Cardinality Attributes with Skew," Computer Software and Applications Conference, Annual International, pp. 61, 22nd International Computer Software and Application Conference, 1998.*

(Continued)

*Primary Examiner*—Neveen Abel Jalil
*Assistant Examiner*—Mark Andrew X Radtke
(74) *Attorney, Agent, or Firm*—Weaver Austin Villeneuve and Sampson LLP

(57) ABSTRACT

Records representing items in a dimensionally-modeled fact collection are assigned to bins. A count-based portion of a user interface receives user bin assignment specification of the records based on user-specified counts of records. Actual counts for bin assignment are determined by constraining records having a same data value at a specified particular dimension to be within the same bin. A user-observable indication of the determined actual counts is provided. The user interface may include a value-based portion. The value-based portion of the user interface may be operated to receive user indication of bin assignment specification of records based on user-specified at least one value at the particular dimension. Determining actual counts includes reconciling the user indication of bin assignment specification in the count-based portion with the user indication of bin assignment specification in the value-based portion.

17 Claims, 4 Drawing Sheets

U.S. PATENT DOCUMENTS

| | | | |
|---|---|---|---|
| 6,549,910 B1* | 4/2003 | Tate | 707/102 |
| 6,865,567 B1* | 3/2005 | Oommen et al. | 707/2 |
| 6,907,422 B1* | 6/2005 | Predovic | 707/2 |
| 7,197,513 B2* | 3/2007 | Tessman et al. | 707/104.1 |
| 7,209,924 B2* | 4/2007 | Bernhardt et al. | 707/101 |
| 7,246,014 B2* | 7/2007 | Forth et al. | 702/60 |
| 7,342,929 B2* | 3/2008 | Bremler-Barr et al. | 370/395.4 |
| 7,562,058 B2* | 7/2009 | Pinto et al. | 706/21 |
| 2002/0077997 A1 | 6/2002 | Colby et al. | |
| 2003/0076848 A1* | 4/2003 | Bremler-Barr et al. | 370/412 |
| 2004/0002980 A1* | 1/2004 | Bernhardt et al. | 707/100 |
| 2005/0068320 A1* | 3/2005 | Jaeger | 345/440 |
| 2005/0240456 A1 | 10/2005 | Ward et al. | |
| 2006/0028470 A1 | 2/2006 | Bennett et al. | |
| 2006/0036639 A1* | 2/2006 | Bauerle et al. | 707/102 |
| 2006/0085561 A1* | 4/2006 | Manasse et al. | 709/247 |
| 2007/0244849 A1* | 10/2007 | Predovic | 707/2 |
| 2008/0016041 A1 | 1/2008 | Frost et al. | |
| 2008/0104101 A1* | 5/2008 | Kirshenbaum et al. | 707/102 |

OTHER PUBLICATIONS

U.S. Appl. No. 11/804,233, filed May 16, 2007.
U.S. Appl. No. 11/752,036, filed May 22, 2007.
U.S. Appl. No. 11/804,196, filed May 17, 2007.
Office Action from U.S. Appl. No. 11/752,036, dated Apr. 20, 2009.
Office Action from U.S. Appl. No. 11/804,196, dated May 26, 2009.
Final Office Action from U.S. Appl. No. 11/752,036, dated Nov. 4, 2009.
Final Office Action from U.S. Appl. No. 11/804,196, dated Nov. 20, 2009.
U.S. Appl. No. 11/804,233, filed Mar. 8, 2010, Ames et al.
Office Action from U.S. Appl. No. 11/804,233, dated Mar. 8, 2010.
Notice of Allowance from U.S. Appl. No. 11/752,036, dated Mar. 23, 2010.

* cited by examiner

VISUAL INTERFACE TO INDICATE CUSTOM BINNING OF ITEMS

BACKGROUND

It is common to analyze large data sets in the process of making business decisions. Such data sets may be thought of as comprising a dimensionally-modeled fact collection. For example, each "record" of the fact collection may represent attributes of an "item" or "entity" such as a particular user of online services, whereas the value at each field of the record represents a value of a particular characteristic of that entity (e.g., age of user, gender of user, number of online page views by that user, etc.). It is known to provide a visual representation of the dimensionally-modeled fact collections as an analysis tool for use in the process of making business decisions.

When interacting with and/or analyzing large data sets, each data set may have many record—millions or more. It can be difficult or impractical to consider all the records individually. Thus, for example, users may prefer to aggregate records together based on values of a particular one or more of the characteristics of the item represented by the record.

It is desirable to provide tools that facilitate the definition of such aggregation.

SUMMARY

Records representing items in a dimensionally-modeled fact collection may be assigned to bins. A count-based portion of a user interface is operated to receive user indication of bin assignment specification of the records based on user-specified at least one count of records within the bins. Actual counts at which to assign the records to bins are determined by at least constraining records having a same data value at a specified particular dimension to be within the same bin, such that the determined actual counts of records at the particular dimension within each bin may be different from the user specified at least one count. A user-observable indication of the determined actual counts is provided.

The user interface may also include a value-based portion. The value-based portion of the user interface may be operated to receive user indication of bin assignment specification of records based on user-specified at least one value at the particular dimension. Determining actual counts includes reconciling the user indication of bin assignment specification in the count-based portion with the user indication of bin assignment specification in the value-based portion.

DETAILED DESCRIPTION

Figure 1:
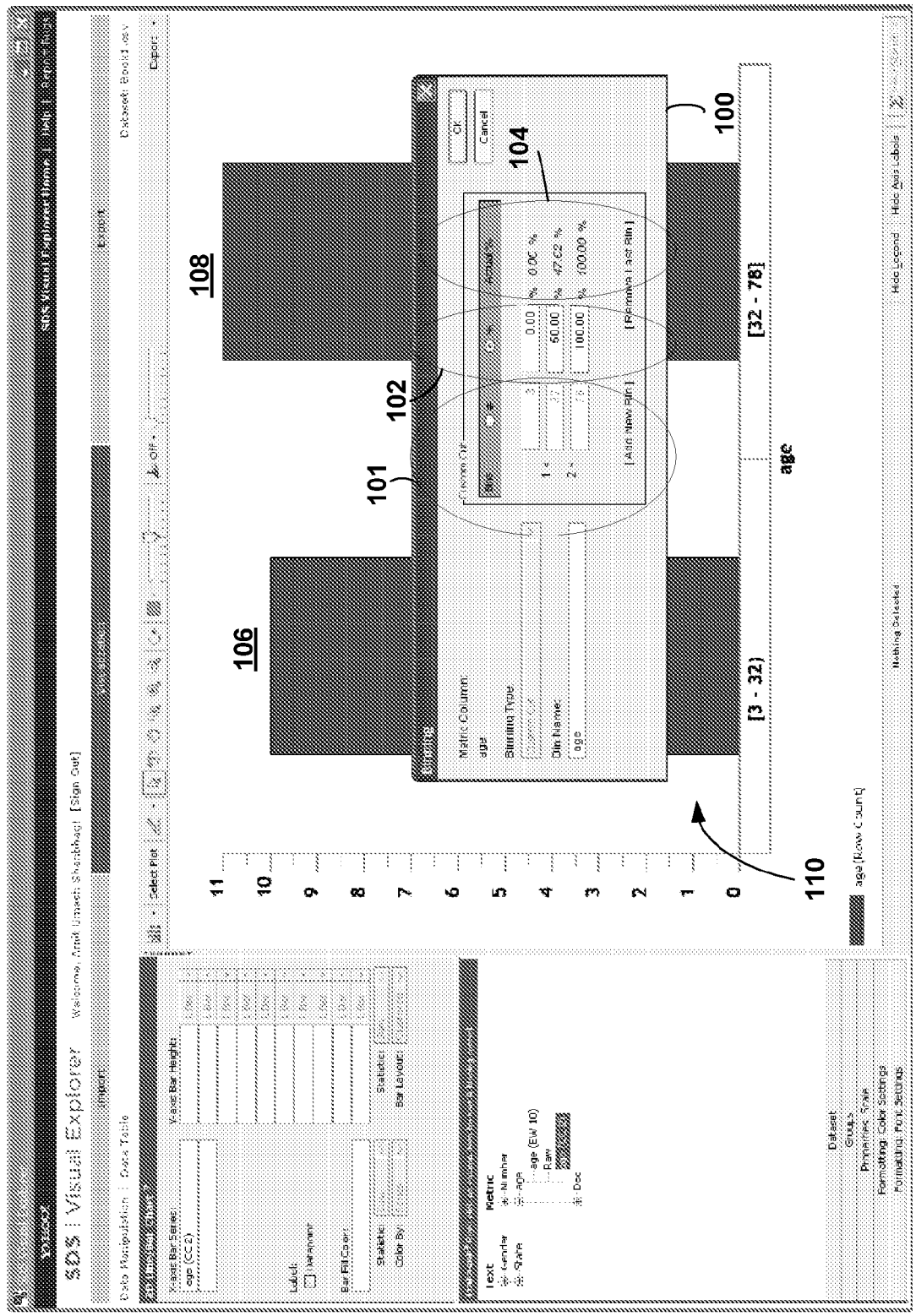
FIG. 1 illustrates an example of a "custom cut" user interface screen 100 that is a front end to processing that includes processing of a dimensionally-modeled fact collection.

In accordance with an aspect of the invention, a user interface to a program executing on one or more computing devices is provided via which users may interact with a dimensionally-modeled fact collection representing a plurality of items and, more particularly, to process the dimensionally-modeled fact collection to specify a desired aggregation of the items. The thus-processed dimensionally-modeled fact collection may then be, for example, represented as a visual display or otherwise processed (e.g., by the at least one computing device). For example, the aggregation may be represented in tabular form or in a graphical form, such as in a histogram graph or box plot.

When aggregating the data into bins, a user may wish to cause divisions to be created that accurately reflect the distribution in the underlying data, so as not to obscure patterns in the original data set. Towards this end, knowing the count of records associated with a given frequency divisions assists in creating more useful bins.

For example, a user may specify at least one count of records within each bin, while the specified counts may be adjusted to determine actual counts by at least constraining records having a same data value at a specified particular dimension to be within the same bin. Thus, the determined actual counts of records at the particular dimension within each bin may be different from the user specified at least one count. The at least one count and the determined actual counts may be represented by a value that is an indication of a number of the records in a bin relative to the total number of records or may be represented by a value that is indication of an absolute number of the records in a bin. In accordance with an aspect, the display to a user dynamically updates an absolute count corresponding to a relative count, and vice versa.

Furthermore, a value specification portion may be provided for a user to specify data values in a particular dimension to specify bins such as, for example, specifying fixed "cut points" of the bins that are values of the records at a particular dimension specified to be dividing data values between bins or, as another example, specifying ranges of such data values for the bins. As a user adjusts a data value specification (e.g., cut point and/or range), one or more counts (e.g., absolute and/or relative) may be dynamically updated. Furthermore, as a user adjusts a count, one or more data value specifications may be dynamically updated. That is, the user may specify data values and/or counts, and changes to either data values or counts may automatically adjust the other, giving feedback as to the effect of change. Additionally, as above, depending on the distribution of data values, bins based on data values may not exactly match a specific count and, in these examples, a "true" count corresponding to the data value specification may also be indicated.

While a particular item of the dimensionally-modeled fact collection may represent many attributes of an item, for simplicity of illustration, we present an example focusing on one particular dimension representing an "age" attribute, to process a dimensionally-modeled fact collection to define a desired aggregation of the items. In the example, the dimensionally-modeled fact collection contains twenty one items that, in no particular order, have the following values at the age dimension:

10, 11, 10, 50, 30, 34, 24, 67, 45, 4, 32, 45, 78, 32, 12, 4, 3, 34, 65, 24, 54

After sorting the items by value of the age dimension, the twenty-one age dimension values are the following:

3, 4, 4, 10, 10, 11, 12, 24, 24, 30, 32, 32, 34, 34, 45, 45, 50, 54, 65, 67, 78.

FIG. 1 illustrates an example of a "custom cut" user interface screen 100 that is a front end to processing that includes processing of a dimensionally-modeled fact collection (which may be, for example, processing to generate a visual representation or may include more demanding processing, which may typically include aggregation processing of values for items of each bin). In the FIG. 1 interface screen 100, it is shown that the user has chosen to "cut" the data into two bins by count of items, each bin nominally having fifty percent of the items. This user choice is indicated in the portion 102 of the interface screen 100. In the FIG. 1 example, the buttons labeled "Add New Bin" may be utilized, when the "%" radio button is selected, as a shortcut to cause another bin to be added and to reallocate the present bins such that the number of items allocated to each bin is nominally equal.

As mentioned above, in the FIG. 1 example, the user has chosen to cut the items into two equal bins, each bin nominally being allocated fifty percent of the items. However, to create bins that each have fifty percent of the items, each bin would have ten or eleven items (21/2 equals 10.5, which is rounded up or down to ten or eleven). In this situation, though, the eleventh item has an age value of 32, which is also the same as the age value of the twelfth item. In general, the binning process is useful to group together items that have the same value in a particular dimension. Thus, it may generally not be useful to bin such that an item having a value in a particular dimension (i.e., in the dimension for which the binning is carried out) is not in the same bin as another item having that same value in the particular dimension.

Referring to the FIG. 1 example, it would generally not be useful to bin by age value such that the eleventh item, having a value of 32 in the age dimension is in a different bin from the twelfth item, also having a value of 32 in the age dimension. Thus, putting the eleventh and twelfth value in the nominal 50 to 100% bin, the items are actually binned such that 47.62% of the items are in one bin and 52.38% of the items are in another bin. This is indicated in a portion 104 of the FIG. 1 user interface portion 100, indicated by the "0%," "47.62%," and "100%" labels. In addition, entries in the portion 101 of the interface 100 are likewise dynamically updated to include an indication of the actual data values corresponding to the bins. In the FIG. 1 example, the actual data values correspond to a value of 3 at the lower end of bin "1" and a value less than 32 at the upper end of bin "1", and also correspond to a value of 32 at the lower end of bin "2" and a value of 78 at the upper end of bin "2."

Furthermore, FIG. 1 also includes a graphical representation of the binning—in this example, a bar chart 110 including two bars, each bar representing one of the bins of items. The bar 106 represents the 0% to 47.62% bin of ten items, indicating the ten items in that bin have values in the age dimension falling into the [3-32) range. Similarly, the bar 108 represents the 47.62% to 100% bin of eleven items, indicating the eleven items in that bin have values in the age dimension falling into the [32-78] range.

Figure 2:
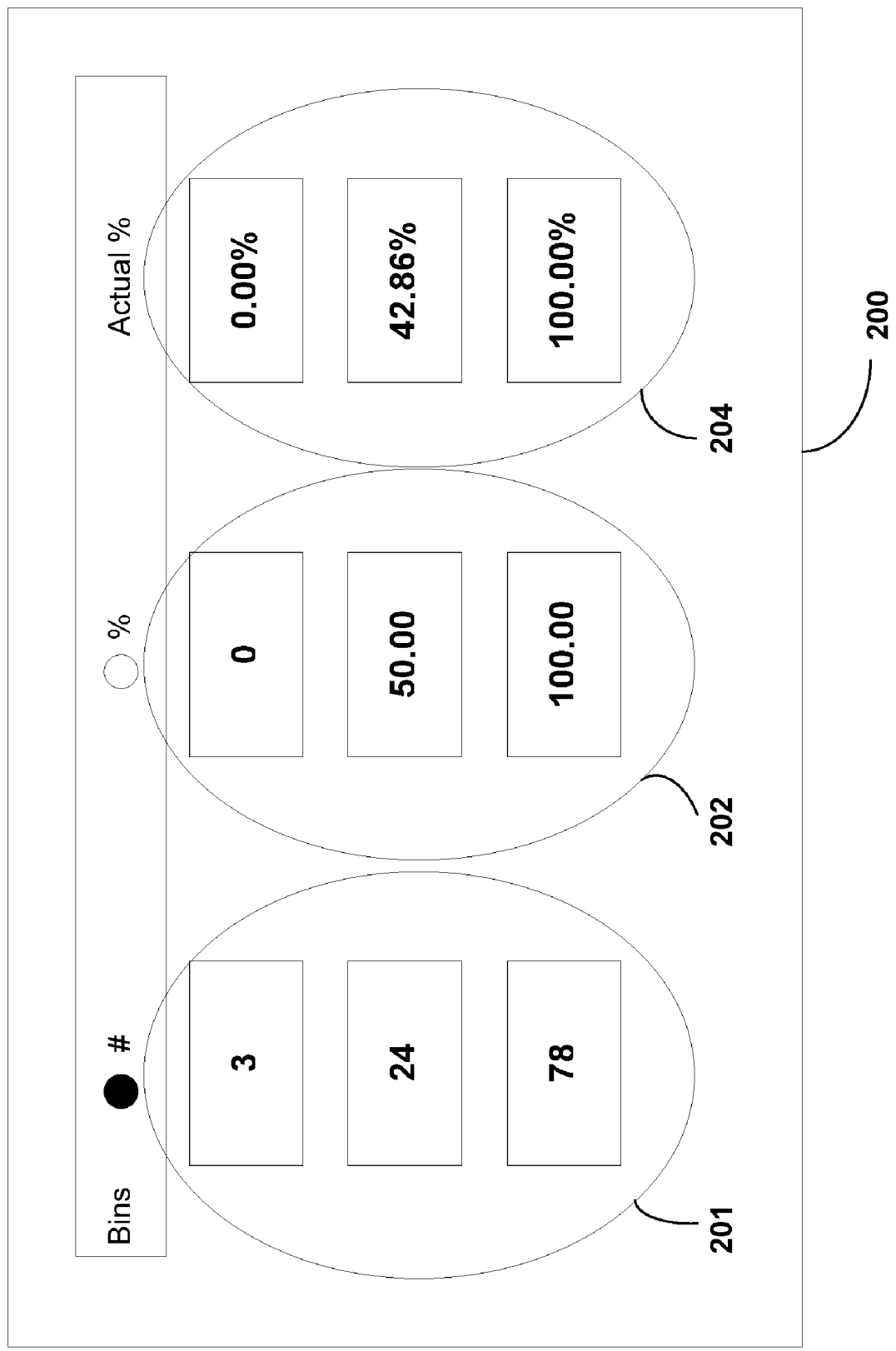
FIG. 2 illustrates an example of binning being designated by value and, in addition, the count indications being correspondingly updated.

While FIG. 1 illustrates an example of binning being designated by count (in the specific example, by percentage) of items, FIG. 2 illustrates an example of binning being designated by value and, in addition, the count indications being correspondingly updated. Referring specifically to FIG. 2, in portion 201 of the interface 200, bin "cut" points have been designated as a result of user input. More particularly, the user has designated that the items should be binned, by age value, as one bin of items with a value in the age dimension between 3 and 25 and as another bin of items with a value in the age dimension between 25 and 78. The portion 204 of the display is updated (e.g., dynamically, on the fly) with corresponding count indications. In FIG. 2, the count indications are the percentage ranges 0.00% to 42.86% and 42.86% to 100.00%. However, the count indications in some examples may be absolute numbers (e.g., 9 and 12, respectively) or integer ratios (e.g., 9/21 and 12/21, respectively). In the FIG. 2 example, the portion 202 changes only with user input, as described above.

For simplicity of illustration, the FIG. 1 and FIG. 2 examples involve only two bins (three cut points) and relatively few data items. However, the principles discussed here apply when there are many bins and/or many data items and may be of great utility in these situations. Also, while the FIG. 1 and FIG. 2 examples involve only one dimension, the principles discussed here apply when binning is in more than one dimension.

Figure 3:
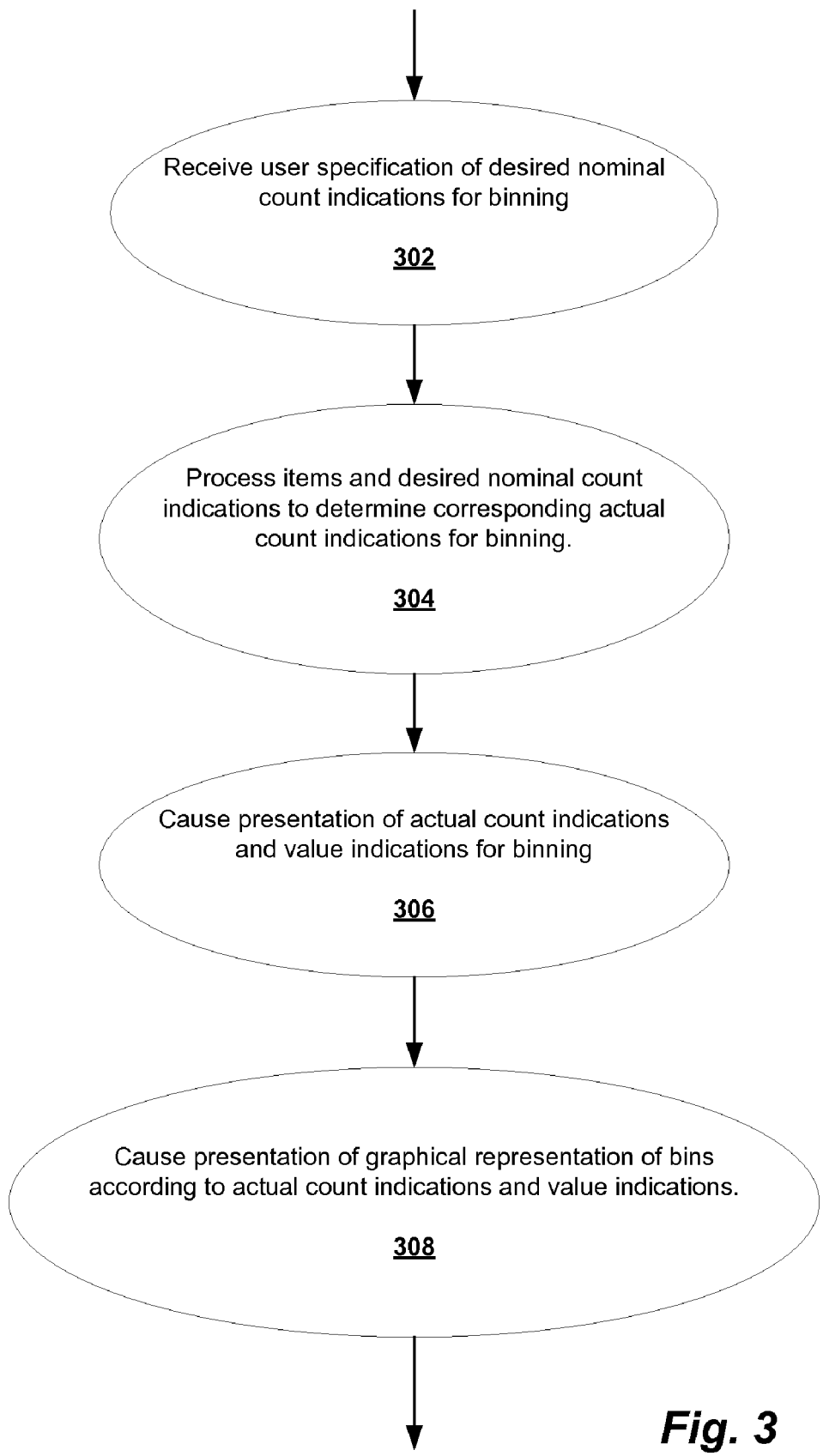
FIG. 3 is a flowchart illustrating a method in which specified desired nominal item counts for binning may be adjusted to determine actual counts by at least constraining records having a same data value at a specified particular dimension to be within the same bin.

FIG. 3 is a flowchart illustrating a method in which specified desired nominal item counts for binning may be adjusted to determine actual counts by at least constraining records having a same data value at a specified particular dimension to be within the same bin. At 302, user specification of desired nominal count indications for binning are received. This may include, for example, a user interacting with an executing program using an appropriate input device to a computer system executing the program. The computer system may be local, remote and or distributed. The user specification may be of count values such as the percentage values shown in portion 102 of the FIG. 1 example.

At 304, the items and desired nominal count indications are processed to determine corresponding actual count indications for binning. At 306, presentation is caused of the actual count indications for binning, as well as corresponding value indications of the bins. Referring to the FIG. 1 example, the actual count indications for binning are caused to be presented in portion 104 of the FIG. 1 example, and the corresponding value indications of the bins are shown in portion 101 of the FIG. 1 example.

FIG. 1 and FIG. 3 illustrate examples only, and variations may be possible. For example, as mentioned above, the count indications need not be specified as percentages but may be, as other examples, absolute counts or ratios, and other types of indications are possible. At 308, presentation of a graphical representation of the binning is caused, according to the actual count indications and the value indications. Referring again to the FIG. 1 example, the bars 106 and 108 graphically represent the bins.

Figure 4:
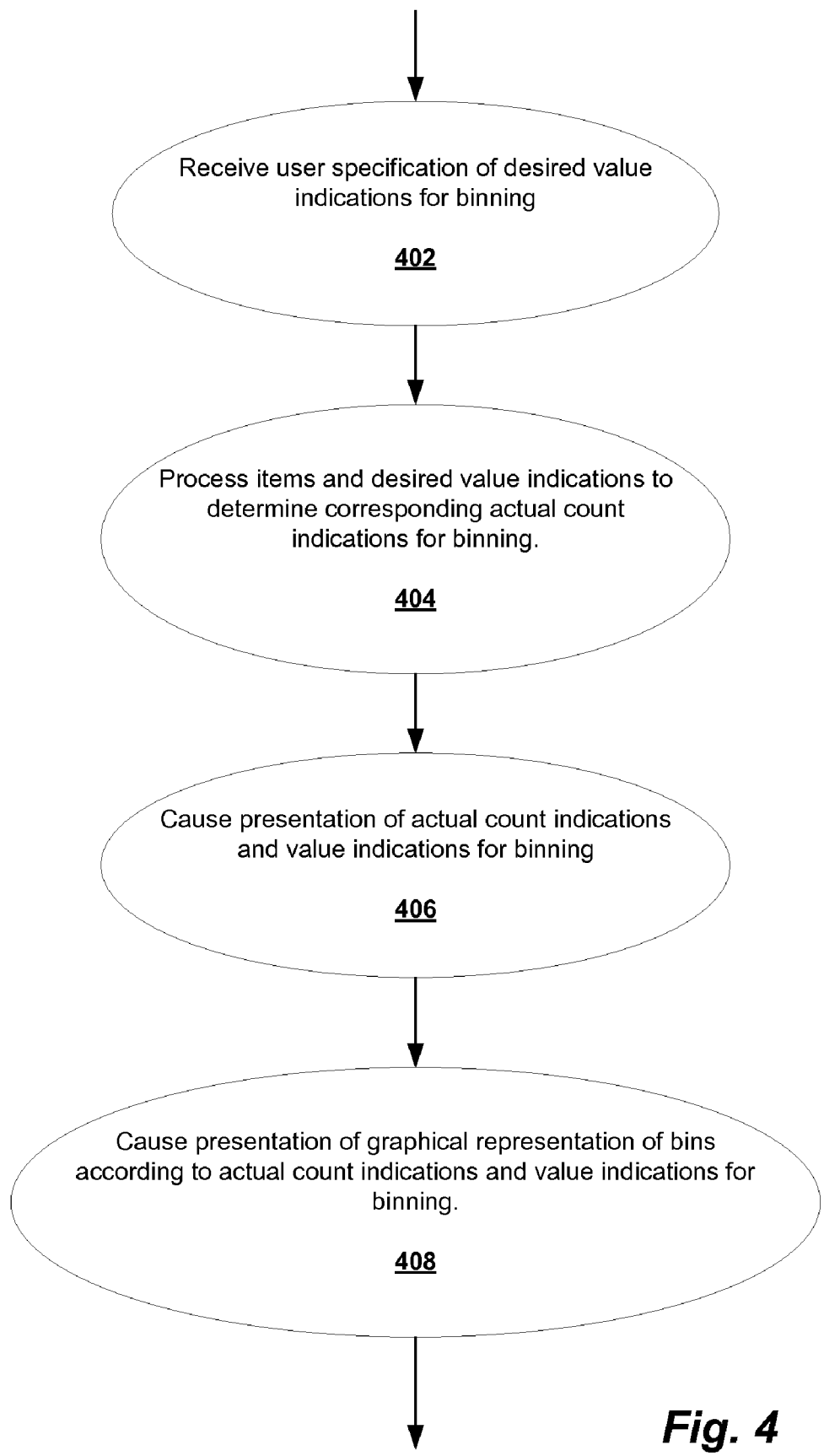
FIG. 4 is a flowchart illustrating a method in which specified desired value indications for binning, with respect to a particular dimension, may be processed.

FIG. 4 is a flowchart illustrating a method in which specified desired value indications for binning, with respect to a particular dimension, may be processed. This may include, for example, a user interacting with an executing program using an appropriate input device to a computer system executing the program. At 402, user specification of value indications for binning are received. For example, the user specification of value indications may be value "cut" points and/or ranges for the bins. At 404, the items and desired value indications are processed to determine actual count indications for binning. At 406, presentation is caused of the value indications of the bins as well as corresponding count indications of the bins. At 408, presentation of a graphical representation of the binning is caused. This is similar, for example, to the presentation caused at 308 in the FIG. 3 flowchart.

An example algorithm to determine corresponding actual count indications for binning is now described, based on either a count-based user selection or a value-based user selection:

1. Sort the list of values to be $x(1), x(2), \ldots, x(N)$, where N=#values in the data set and $x(i)<x(i+1)$ for $i=1, 2, \ldots, N-1$.

For count-based user selection:

2. user specifies desired # values (count) in bins to be $a(1), a(2), \ldots, a(M)$, where M=#bins;

3. actual count for each bin is determined to be $b(1), b(2), \ldots, b(M)$ where sum $((|a(j)-b(j)|)\hat{\ }2)$ for $j=1, 2, \ldots, M$ is minimized and $x(i)<x(i+1)$, where $x(i)$ is in bin $b(j)$ and $x(i+1)$ is in bin $b(j+1)$ for $j=1, 2, \ldots, M-1$.

4. actual cut values (points) for each bin are determined to be $\{x(sum(b(0), b(1), b(2), \ldots, b(k))), \ldots, x(sum(b(0), b(1), b(2), \ldots, b(k), b(k+1))-1)\}$ where $k=0, 1, 2, \ldots M-1$ and $b(0)=0$. The last value $x(N)$ is placed in bin $b(M)$.

For value-based user selection:

2. user specifies desired bin cut values to be $c(0), c(1), c(2), \ldots, c(M)$, where M=#bins and $c(k)<c(k+1)$ for $k=0, 1, \ldots, M-1$, and $c(0)=x(1)$ and $c(M)=x(N)$;

3. actual values in each bin k will be $c(k)=<\{x(i), x(i+1), \ldots\}<c(k+1)$ for $k=0, 1, \ldots, M-1$. The last value $x(N)$ is placed in bin M.

4. actual count for each bin k is determined to be count of x values in $c(k)=<\{x(i), x(i+1), \ldots\}<c(k+1)$ for $k=1, \ldots, M-1$ and $x(N)$ is in bin M.

We have thus described an apparatus/method such that, when aggregating items of a dimensionally-modeled fact collection into bins, user choices are guided/adjusted to more faithfully reflect the distribution in the underlying items, to minimize obscuring of patterns in the original data set. For example, adjusting the count of records associated with a desired nominal count of records for binning of the items may assist in determining binning that may increase the usefulness of the binning for analysis of the items. Furthermore, by allowing a user to also specify binning parameters based on values of the items in a particular dimension, and concomitantly providing indications of counts of records corresponding to the specified value-based binning parameters, user flexibility for binning specification may be enhanced.

What is claimed is:

1. A method of effecting assignment to bins of records representing items in a dimensionally-modeled fact collection, the method comprising:
   representing a plurality of parameters on different portions of a user interface simultaneously, the plurality of parameters including a count of records parameter and a fixed cut points parameter;
   providing a count of records portion of the user interface configured to receive user indication of a desired count of records for one or more of the bins, the desired count of records used in assigning a corresponding number of records to the one or more bin, wherein a user-specified desired count of records for a bin is made either by specification of a value that is an indication of a number of the records desired to be assigned to that bin relative to the total number of records, or an absolute number of the records to be assigned to that bin;
   providing a fixed cut points portion of the user interface configured to receive user indication of fixed data value dividing points between the different bins, the dividing points used in determining how to assign records to the different bins;
   wherein a user change to the count of records portion of the user interface produces a corresponding change to the fixed cut points portion of the user interface, and
   wherein a user change to the fixed cut points portion of the user interface produces a corresponding change to the count of records portion of the user interface;
   determining actual counts for assigning the records to the bins by constraining records having a same data value at a specified particular dimension to be within the same bin, such that the determined actual counts of records at the particular dimension within each bin are different from the user specified desired count of records for one or more of the bins; and
   providing a user-observable indication of the determined actual counts.

2. The method of claim 1, further comprising:
   operating the fixed cut points portion of the user interface to receive user indication of bin assignment specification of records based on a user-specified value at the particular dimension;
   wherein determining actual counts includes adjusting the user indication of bin assignment specification in the count of records portion based at least in part on the user indication of bin assignment specification in the fixed cut points portion.

3. The method of claim 2, wherein:
   the user-specified value at the particular dimension includes user-specified fixed cut points for the bins at the particular dimension.

4. The method of claim 2, wherein:
   adjusting the user indication of bin assignment specification in the count of records portion based at least in part on the user indication of bin assignment specification in the fixed cut points portion includes adjusting the actual bin assignment specification in the count of records portion to be consistent with the actual bin assignment specification in the fixed cut points portion.

5. The method of claim 1, wherein:
   specification of a value that is indication of a number of records relative to the total number of records includes indication of percentile ranges, with respect to the values at the particular dimension, for bins.

6. The method of claim 1, further comprising:
   operating the count of records portion of the user interface to assign the records to the bins with respect to a dimension other than the particular dimension.

7. The method of claim 2, further comprising:
   operating the count of records portion and the fixed cut points portion of the user interface to assign the records to the bins with respect to a dimension other than the particular dimension.

8. A computing system including:
   at least one computing device, configured to effect assignment to bins of records representing items in a dimensionally-modeled fact collection, the at least one computing device configured to:
   represent a plurality of parameters on different portions of a user interface simultaneously, the plurality of parameters including a count of records parameter and a fixed cut points parameter;
   provide a count of records portion of the user interface configured to receive user indication of a desired count of records for one or more of the bins, the desired count of records used in assigning a corresponding number of records to the one or more bins, wherein a user-specified desired count of records for a bin is made either by specification of a value that is an indication of a number of the records desired to be assigned to that bin relative to the total number of records, or an absolute number of the records to be assigned to that bin;

provide a fixed cut points portion of the user interface configured to receive user indication of fixed data value dividing points between the different bins, the dividing points used in determining how to assign records to the different bins;

wherein a user change to the count of records portion of the user interface produces a corresponding change to the fixed cut points portion of the user interface, and wherein a user change to the fixed cut points portion of the user interface produces a corresponding change to the count of records portion of the user interface;

determine actual counts for assigning the records to the bins by constraining records having a same data value at a specified particular dimension to be within the same bin, such that the determined actual counts of records at the particular dimension within each bin are different from the user specified desired count of records for one or more of the bins; and provide a user-observable indication of the determined actual counts.

9. The computing system of claim 8, the at least one computing device further configured to:

operate the fixed cut points portion of the user interface to receive user indication of bin assignment specification of records based on a user-specified value at the particular dimension;

wherein determining actual counts includes adjusting the user indication of bin assignment specification in the count of records portion based at least in part on the user indication of bin assignment specification in the fixed cut points portion.

10. The computing system of claim 9, wherein:

being configured to adjust the user indication of bin assignment specification in the count of records portion based at least in part on the user indication of bin assignment specification in the fixed cut points portion includes being configured to adjust the actual bin assignment specification in the count of records portion to be consistent with the actual bin assignment specification in the fixed cut points portion.

11. The computing system of claim 8, wherein the at least one computing device is further configured to:

operate the count of records portion of the user interface to assign the records to the bins with respect to a dimension other than the particular dimension.

12. The computing system of claim 9, wherein the at least one computing device is further configured to:

operate the count of records portion and the fixed cut points portion of the user interface to assign the records to the bins with respect to a dimension other than the particular dimension.

13. A computer program product for effecting assignment to bins of records representing items in a dimensionally-modeled fact collection, the computer program product comprising at least one computer-readable storage medium having computer program instructions stored therein which are operable to cause at least one computing device to:

represent a plurality of parameters on different portions of a user interface simultaneously, the plurality of parameters including a count of records parameter and a fixed cut points parameter;

provide a count of records portion of the user interface configured to receive user indication of a desired count of records for one or more of the bins, the desired count of records used in assigning a corresponding number of records to the one or more bins, wherein a user-specified desired count of records for a bin is made either by specification of a value that is an indication of a number of the records desired to be assigned to that bin relative to the total number of records, or an absolute number of the records to be assigned to that bin;

provide a fixed cut points portion of the user interface configured to receive user indication of fixed data value dividing points between the different bins, the dividing points used in determining how to assign records to the different bins;

wherein a user change to the count of records portion of the user interface produces a corresponding change to the fixed cut points portion of the user interface, and wherein a user change to the fixed cut points portion of the user interface produces a corresponding change to the count of records portion of the user interface;

determine actual counts for assigning the records to the bins by constraining records having a same data value at a specified particular dimension to be within the same bin, such that the determined actual counts of records at the particular dimension within each bin are different from the user specified desired count of records for one or more of the bins; and provide a user-observable indication of the determined actual counts.

14. The computer program product of claim 13, the computer program instructions further operable to cause the at least one computing device to:

operate the fixed cut points portion of the user interface to receive user indication of bin assignment specification of records based on a user-specified value at the particular dimension;

wherein determining actual counts includes adjusting the user indication of bin assignment specification in the count of records portion based at least in part on the user indication of bin assignment specification in the fixed cut points portion.

15. The computer program product of claim 14, wherein:

adjusting the user indication of bin assignment specification in the count of records portion based at least in part on the user indication of bin assignment specification in the fixed cut points portion includes adjusting the actual bin assignment specification in the count of records portion to be consistent with the actual bin assignment specification in the fixed cut points portion.

16. The computer program product of claim 13, the computer program instructions further operable to cause the at least one computing device to:

operate the count of records portion of the user interface to assign the records to the bins with respect to a dimension other than the particular dimension.

17. The computer program product of claim 14, the computer program instructions further operable to cause the at least one computing device to:

operate the count of records portion and the fixed cut points portion of the user interface to assign the records to the bins with respect to a dimension other than the particular dimension.

* * * * *